(No Model.)

W. L. DODGE.
TURNER FOR GRIDDLE CAKES.

No. 550,556. Patented Nov. 26, 1895.

Witnesses
Winifred L. Kerwin
Edward C. Brown

Inventor.
William L. Dodge
by Edwin Planta
Attorney.

UNITED STATES PATENT OFFICE.

WILLIAM L. DODGE, OF HAVERHILL, ASSIGNOR TO ORRIN E. MICKEL, OF BRADFORD, MASSACHUSETTS.

TURNER FOR GRIDDLE-CAKES.

SPECIFICATION forming part of Letters Patent No. 550,556, dated November 26, 1895.

Application filed March 1, 1895. Serial No. 540,264. (No model.)

*To all whom it may concern:*

Be it known that I, WILLIAM L. DODGE, a citizen of the United States, residing at Haverhill, in the county of Essex and State of Massachusetts, have invented certain new and useful Improvements in Cake-Turners, of which the following, taken in connection with the accompanying drawings, is a specification.

The object of my invention is to produce an apparatus for turning over griddle-cakes and the like, so that they will be deposited in the same place on the griddle but with the other side up; and the invention consists of a flat plate having lugs or ears on each side in which a bar having a right and left hand twist is secured, and a spring handle the ends of which are formed with slots through which the twisted bar passes, so that when the handle is compressed the plate will be turned over and when the pressure is released the plate will assume its normal position, as hereinafter fully described, and pointed out in the claims.

Figure 1:
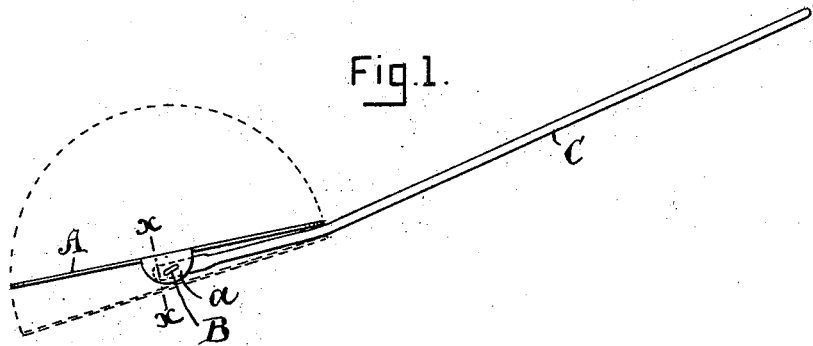
Figure 2:
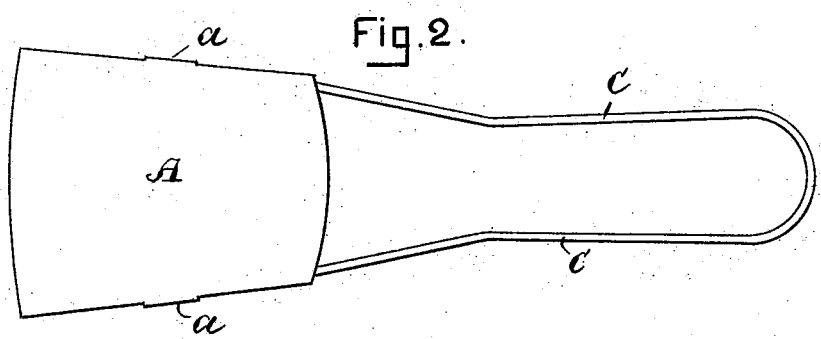
Figure 3:
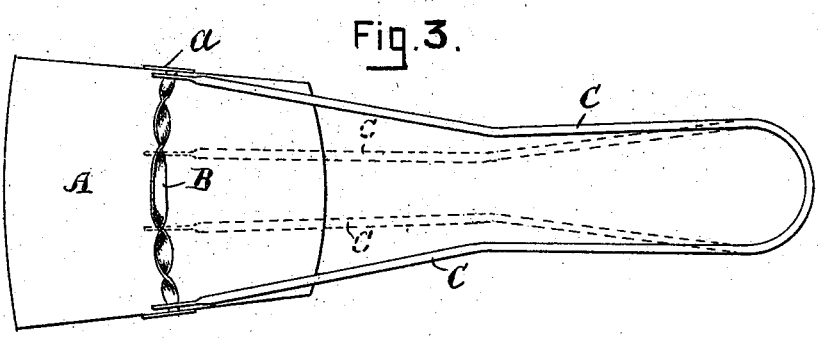
Figure 4:
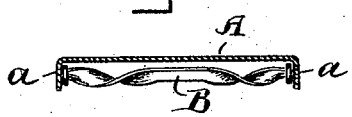

Referring to the accompanying drawings, Figure 1 represents a side view of a griddle-cake turner embodying my invention. Fig. 2 is a plan or top view of same. Fig. 3 is a view of the under side, and Fig. 4 is a cross-section taken on line $x$ $x$ of Fig. 1.

A represents a thin metal plate, preferably of the form shown, and having a bent-down ear $a$ on each side, in which ears is mounted a flat bar B, having a right-hand twist on one end and a left-hand twist on the other end.

C is a bent handle formed of wire and having its ends flattened, which ends are formed with slots just sufficiently large to fit upon the twisted bar B. Thus when the plate A is in its normal position its upper edge will rest upon the top side of the handle C, in which position it is ready to be employed to scoop up cakes, eggs, fish, or other substance that is on the griddle or pan and which requires to be turned. After said article has been thus scooped up so as to rest upon said plate A, then the upper end of the handle C is compressed until it is in the position shown in the dotted lines in Fig. 3. The ends of said handle working on the twisted bar B cause the plate A to be turned entirely over, so that said plate is in the position shown in dotted lines in Fig. 1. Now upon releasing the pressure upon the handle C the ends of same fly apart and the plate is caused to assume its normal position.

It will be seen that by this construction whatever article is scooped up by the plate A can be turned completely over and deposited in the same place that it first occupied, and that by simply compressing the handle C.

What I claim is—

1. A turner for griddle cakes and other articles consisting of a flat plate and a handle said handle being attached to a bar secured to the plate, said bar having a right and left hand twist whereby the plate will be caused to turn over when the handle is compressed and assume its normal position when the handle is released substantially as set forth.

2. A turner for griddle cakes and other articles consisting of a flat plate having an ear on each side, a flat bar having a right and left hand twist secured to said ears and a spring handle the ends of which are formed with slots in which the twisted bar works substantially as set forth.

In testimony whereof I have signed my name to this specification, in the presence of two subscribing witnesses, on this 11th day of February, A. D. 1895.

WILLIAM L. DODGE.

Witnesses:
SAMUEL L. JEWETT,
CHARLES J. HALPEN.